United States Patent
Konishi et al.

(10) Patent No.: US 11,409,300 B2
(45) Date of Patent: Aug. 9, 2022

(54) AUTONOMOUS CAR, TRAVELING CONTROLLER, TRAVELING CONTROL METHOD, AND STORAGE MEDIUM STORING CONTROL PROGRAM

(71) Applicant: Panasonic Intellectual Property Corporation of America, Torrance, CA (US)

(72) Inventors: Kazunobu Konishi, Osaka (JP); Shuhei Matsui, Osaka (JP); Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/021,104

(22) Filed: Jun. 28, 2018

(65) Prior Publication Data

US 2019/0011926 A1  Jan. 10, 2019

(30) Foreign Application Priority Data

Jul. 5, 2017  (JP) .............................. JP2017-132181
Feb. 26, 2018  (JP) .............................. JP2018-031626

(51) Int. Cl.
*G05D 1/02* (2020.01)
*G01C 21/34* (2006.01)
(Continued)

(52) U.S. Cl.
CPC ............ *G05D 1/0217* (2013.01); *B60L 53/00* (2019.02); *G01C 21/343* (2013.01);
(Continued)

(58) Field of Classification Search
CPC ............... G05D 1/0217; G05D 1/0088; G05D 2201/0212; G05D 2201/0213;
(Continued)

(56) References Cited

U.S. PATENT DOCUMENTS 9,754,490 B2 * 9/2017 Kentley ............. G06K 9/00805
9,786,187 B1 * 10/2017 Bar-Zeev ......... G06Q 10/08355
(Continued)

FOREIGN PATENT DOCUMENTS

JP  2011174890   *  9/2011
JP  2012-048563 A   3/2012
(Continued)

OTHER PUBLICATIONS

The Extended European Search Report from the European Patent Office (EPO) dated Dec. 17, 2018 for the related European Patent Application No. 18180673.8.
Communication pursuant to Article 94(3) EPC from European Patent Office (EPO) dated Apr. 29, 2020 for the related European Patent Application No. 18180673.8.
(Continued)

*Primary Examiner* — Jess Whittington
*Assistant Examiner* — Annmarie Dressler
(74) *Attorney, Agent, or Firm* — Greenblum & Bernstein, P.L.C.

(57) ABSTRACT

Various embodiments are provided for controlling an autonomous car. The embodiments acquire meeting information indicating a place of a meeting and a time of the meeting. A remaining time between the time of the meeting and a current time is calculated. A waiting time for waiting in a waiting place by the autonomous car and a traveling time for traveling to the place of the meeting by the autonomous car are determined. The waiting and traveling times are determined to minimize a total cost and to make a total time within the remaining time. The total cost includes a cost of the traveling and a cost of the waiting. The total time includes the waiting and traveling times. A route along which the autonomous car is to travel to the place of the meeting within the traveling time is determined.

16 Claims, 3 Drawing Sheets

(51) Int. Cl.
*G06Q 10/04* (2012.01)
*B60L 53/00* (2019.01)
*G05D 1/00* (2006.01)
*G08G 1/00* (2006.01)
*G06Q 10/08* (2012.01)

(52) U.S. Cl.
CPC ..... *G01C 21/3438* (2013.01); *G01C 21/3469* (2013.01); *G01C 21/3476* (2013.01); *G05D 1/0088* (2013.01); *G06Q 10/047* (2013.01); *G06Q 10/083* (2013.01); *G08G 1/00* (2013.01); *B60L 2240/62* (2013.01); *B60L 2240/68* (2013.01); *B60L 2240/80* (2013.01); *B60L 2260/32* (2013.01); *B60L 2260/58* (2013.01); *G05D 1/0274* (2013.01); *G05D 1/0278* (2013.01); *G05D 2201/0212* (2013.01); *G05D 2201/0213* (2013.01); *Y02T 10/70* (2013.01); *Y02T 10/7072* (2013.01); *Y02T 10/72* (2013.01); *Y02T 90/14* (2013.01); *Y02T 90/16* (2013.01)

(58) Field of Classification Search
CPC ............... G05D 1/0278; G05D 1/0274; G01C 21/3469; G01C 21/3438; G01C 21/343; G01C 21/3492; G01C 21/3476; G01C 21/3453; B60L 2260/58; B60L 2260/32; B60L 2240/80; B60L 2240/68; B60L 2240/62; B60L 53/00; G06Q 10/083; G06Q 10/047; G08G 1/00; Y02T 90/14; Y02T 10/7072; Y02T 10/70; Y02T 10/72; Y02T 90/16
See application file for complete search history.

(56) References Cited

U.S. PATENT DOCUMENTS

| | | | |
|---|---|---|---|
| 10,241,516 B1* | 3/2019 | Brady | G05D 1/0225 |
| 2011/0238457 A1* | 9/2011 | Mason | G06Q 10/063112 705/7.14 |
| 2013/0046456 A1 | 2/2013 | Scofield et al. | |
| 2013/0218453 A1* | 8/2013 | Geelen | G01C 21/3626 701/410 |
| 2013/0226441 A1* | 8/2013 | Horita | G01C 21/3469 701/118 |
| 2014/0164126 A1* | 6/2014 | Nicholas | G06Q 30/08 705/14.58 |
| 2015/0106001 A1* | 4/2015 | Lee | G01C 21/36 701/123 |
| 2015/0241233 A1* | 8/2015 | Loftus | G01C 21/3469 701/410 |
| 2015/0241241 A1* | 8/2015 | Cudak | B62D 15/027 701/408 |
| 2015/0242944 A1 | 8/2015 | Willard et al. | |
| 2016/0231136 A1* | 8/2016 | Hoch | G06Q 30/0284 |
| 2017/0059336 A1* | 3/2017 | Huang | G01C 21/343 |
| 2018/0123360 A1* | 5/2018 | Eaves | H02J 7/00032 |
| 2018/0335777 A1* | 11/2018 | Gibbs | G05D 1/0297 |
| 2018/0364061 A1* | 12/2018 | Chen | G01C 21/3469 |

FOREIGN PATENT DOCUMENTS

| | | | |
|---|---|---|---|
| JP | 2016-091411 | 5/2016 | |
| JP | 2016-115364 | 6/2016 | |
| WO | WO-2018180583 A1 * | 10/2018 | ............... B60L 3/00 |

* cited by examiner

AUTONOMOUS CAR, TRAVELING CONTROLLER, TRAVELING CONTROL METHOD, AND STORAGE MEDIUM STORING CONTROL PROGRAM

BACKGROUND

1. Technical Field

The present disclosure relates to an autonomous car, a traveling controller that controls traveling of the autonomous car, a traveling control method for controlling the same, and a storage medium storing a control program for controlling the same.

2. Description of the Related Art

In recent years, technologies related to an autonomous car that is an automobile that travels automatically or in an unmanned state have been developed, and plans and experiments for practical implementation of delivering a package by using such an autonomous car as an automatic-driving delivery car. Among these, a vehicle-allocation method using an automatic-driving automobile as an automobile to be allocated has been proposed.

For example, Japanese Unexamined Patent Application Publication No. 2016-115364 discloses a vehicle-allocation system. The vehicle-allocation system includes a vehicle-allocation management server and an automatic-driving vehicle, and the vehicle-allocation management server allocates the automatic-driving vehicle to a user based on a vehicle allocation request from the user to the vehicle-allocation management server. The automatic-driving vehicle includes a first communication unit, a first storage, a first authentication unit, a second authentication unit, and a determination unit. The first communication unit wirelessly communicates with the vehicle-allocation management server. The first storage stores in advance first information for authentication reference of the user. The first authentication unit judges whether the user is authenticated by using acquired first information for authentication of the user and the first information for authentication reference stored in the first storage. The second authentication unit transmits acquired second information for authentication to the vehicle-allocation management server and judges whether the user is authenticated in accordance with a confirmation authentication result received in response from the vehicle-allocation management server. The determination unit determines that the automatic-driving vehicle is usable when the authentication by the first authentication unit and the authentication by the second authentication unit are both successful.

Japanese Unexamined Patent Application Publication No. 2016-91411 discloses a center device. The center device acquires information indicating the current location of a user. The center device also acquires information indicating the current location of a vehicle and the use situation of the vehicle. Based on these pieces of information, the center device determines an allocation-scheduled vehicle that is allocatable to the user and a riding place. The center device sets a user route from the current location of the user to the riding place and a vehicle route from the current location of the allocation-scheduled vehicle to the riding place. The center device respectively transmits route information indicating the user route to a communication terminal held by the user and route information indicating the vehicle route to the vehicle corresponding to the allocation-scheduled vehicle. When acquiring, from the center device, route information indicating a route from the current location of the vehicle to the riding place, the vehicle causes itself to be automatically driven and travel to the riding place along the route indicated by the route information.

However, the related arts described above do not study the use of a charged waiting place by the autonomous car to meet a user for receiving a package, riding by the user, or the like. Further improvement is needed for a method for using a charged waiting place to meet a user for receiving a package, riding by the user, or the like.

SUMMARY

One non-limiting and exemplary embodiment provides an autonomous car, a traveling controller, a traveling control method, and a control program that enable arrival at a place of a meeting with a user by meeting time and that minimization of cost involved with the autonomous car on the assumption that a charged waiting place is used for the meeting with the user for the autonomous car.

In one general aspect, the techniques disclosed here feature an autonomous car including a memory and a processor that, in operation, performs operations including acquiring meeting information indicating a place of a meeting with a user and a time of the meeting with the user, calculating a remaining time between the time of the meeting and a current time, determining a waiting time for waiting in a waiting place by the autonomous car and a traveling time for traveling to the place of the meeting by the autonomous car, the determining being performed to minimize a total cost and to make a total time within the remaining time, the total cost including a traveling cost of the traveling and a waiting cost of the waiting, the total time including the waiting time and the traveling time, and determining a route along which the autonomous car is to travel to the place of the meeting within the traveling time.

According to the present disclosure, if the autonomous car uses a charged waiting place for the meeting with the user, the autonomous car can arrive at the place of the meeting with the user by the time of the meeting and minimize the cost involved with the autonomous car.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Underlying Knowledge Forming Basis of the Present Disclosure

As described above in the vehicle-allocation method in the related arts, any cost involved with an autonomous car in a case where the autonomous car uses a charged waiting place, for example, a charged parking lot and waits for a meeting with a user has not been studied.

However, if, for example, a charged parking lot is used as a place of a meeting with a user where a package is to be received or where the user is to ride in an autonomous vehicle, and if the autonomous car arrives at and enters the parking lot earlier than time of the meeting with the user, the autonomous car needs to be parked and wait for the user in the parking lot for a long time. This leads to a high parking charge.

It is thus desirable that the autonomous car enter the parking lot immediately before the time of the meeting with the user. However, if the autonomous car has time to spare before the meeting time, the autonomous car needs to travel to time its arrival. In this case, the autonomous car travels along a longer route to the parking lot, instead of the shortest route, and an extra fuel cost involved with the traveling, for example, the costs for gasoline and electricity are needed. Alternatively, the autonomous car can wait in the charged waiting place and time its arrival at the place of the meeting with the user. However, also in this case, waiting cost involved with waiting time taken to wait in the waiting place, for example, a parking charge is needed.

To address the above-described problem, the waiting cost involved with the waiting time taken to wait in the waiting place and traveling cost involved with the traveling time taken until the autonomous car arrives at the place of the meeting need to be compared and considered, and the charged waiting place needs to be used for the receiving of the package or the riding by the user. Based on the underlying knowledge, the inventors of the present application have earnestly studied how the cost involved with the autonomous car is minimized if the autonomous car uses a charged waiting place for the meeting with the user and as a result, have completed the present disclosure.

According to an aspect of the present disclosure, an autonomous car includes a memory and a processor that, in operation, performs operations including acquiring meeting information indicating a place of a meeting with a user and a time of the meeting with the user, calculating a remaining time between the time of the meeting and a current time, determining a waiting time for waiting in a waiting place by the autonomous car and a traveling time for traveling to the place of the meeting by the autonomous car, the determining being performed to minimize a total cost and to make a total time within the remaining time, the total cost including a traveling cost of the traveling and a waiting cost of the waiting, the total time including the waiting time and the traveling time, and determining a route along which the autonomous car is to travel to the place of the meeting within the traveling time.

The autonomous car thus configured acquires the meeting information indicating the place of the meeting with the user and the time of the meeting with the user and calculates the remaining time from the difference between the time of the meeting and the current time. The autonomous car also determines the waiting time taken to wait in the waiting place and the traveling time taken until the autonomous car arrives at the place of the meeting. The determining of the waiting time and the traveling time is performed to minimize the total cost and to make the total time within the remaining time. The total cost is composed of traveling cost involved with the traveling time and waiting cost involved with the waiting time. The total time is composed of the waiting time and the traveling time. The autonomous car also determines the route along which the autonomous car is caused to travel to arrive at the place of the meeting in the traveling time. Accordingly, the autonomous car can arrive at the place of the meeting by the time of the meeting, and the total cost composed of the waiting cost and the traveling cost that are involved with the autonomous car can be minimized. As a result, if the autonomous car uses a charged waiting place for the meeting with the user, the autonomous car can arrive at the place of the meeting by the time of the meeting with the user, and the cost involved with the autonomous car can be minimized.

The autonomous car may be an electric vehicle configured to use electricity as a source of energy for the traveling. The total cost may include an electrical cost of electricity consumed in the traveling.

The autonomous car thus configured determines the waiting time and the traveling time to minimize the total cost and to make the total time within the remaining time, the total cost being composed of the waiting cost involved with the electric vehicle and the electrical cost involved with the electricity consumed in the traveling time taken until the electric vehicle arrives at the place of the meeting, the total time being composed of the waiting time and the traveling time. Accordingly, if the electric vehicle uses a charged waiting place for the meeting with the user, the electric vehicle can arrive at the place of the meeting by the time of the meeting with the user, and the cost involved with the electric vehicle can be minimized.

The autonomous car may further include a battery that supplies power to the autonomous car. The operations may further include calculating a charging time for charging the battery, the total time including the charging time, the waiting time, and the traveling time, and wherein the route is for causing the electric vehicle to travel to the place of the meeting after the charging of the battery and within the traveling time.

The autonomous car thus configured calculates the charging time taken to charge the battery and determines the waiting time and the traveling time to minimize the total cost composed of the waiting cost and the electrical cost and to make the total time within the remaining time, the total time being composed of the charging time, the waiting time, and the traveling time. The autonomous car also determines the route along which the electric vehicle is caused to travel to arrive at the place of the meeting after charging the battery and in the determined traveling time. Accordingly, the electric vehicle can charge the battery and arrive at the place of the meeting by the time of the meeting. Further, the waiting cost corresponding to the charging time for the battery can be reduced, and the total cost composed of the waiting cost and the electrical cost that are involved with the electric vehicle can thus be reduced more.

The operations may further include calculating the waiting cost based on a waiting charge incremented every predetermined unit time.

The autonomous car thus configured calculates the waiting cost based on the waiting charge incremented every predetermined unit time. Accordingly, even if a charged waiting place charged the waiting charge every predetermined unit time is used, the total cost composed of the waiting cost and the traveling cost that are involved with the autonomous car can be minimized by effectively utilizing the unit time incurring the fixed waiting cost.

The operations may further include calculating the traveling cost based on fuel efficiency performance or electrical cost needed for traveling per unit time, the traveling cost being a cost of a source of energy consumed in the traveling to the place of the meeting. The fuel efficiency performance or the electrical cost needed for traveling per unit time may be based on a carrying capacity of the autonomous car.

The autonomous car thus configured calculates the traveling cost based on fuel efficiency performance. Accordingly, more accurate traveling cost can be calculated without a fuel efficiency performance error caused by the carrying capacity.

The autonomous car may be an automatic-driving delivery car that is automatically driven and that delivers a package to the user. The place of the meeting may be where the package to the user is to be delivered to the user.

The autonomous car thus configured is used as the automatic-driving delivery car that is automatically driven and that delivers the package addressed to the user. The autonomous car delivers the package to the user at the place of the meeting. Accordingly, if the automatic-driving delivery car uses a charged waiting place to deliver the package to the user, the automatic-driving delivery car can arrive at the place of the meeting by the time of the meeting with the user, and the cost involved with the automatic-driving delivery car can be minimized.

The autonomous car may be an automatic-driving transport car that is automatically driven and that transports the user. The place of the meeting may be where the user is to begin transport in the autonomous car.

According to the autonomous car thus configured, the automatic-driving transport car is automatically driven and transports the user from the place of the meeting. Accordingly, if the automatic-driving transport car uses a charged waiting place for the transport of the user, the automatic-driving transport car can arrive at the place of the meeting by the time of the meeting with the user, and the cost involved with the automatic-driving transport car can be minimized.

The waiting place may be the place of the meeting. The waiting cost of the waiting may include a parking cost incurred until the time of the meeting with the user. The memory may store in advance a plurality of parking lots and parking costs associated with the plurality of parking lots. The operations may further include calculating a ratio of the waiting time to the traveling time, the ratio indicating a minimum cost within a range in which the total time is within the remaining time. The operations may further include calculating the traveling cost of the traveling based on fuel efficiency performance, the fuel efficiency performance including at least one of traveling conditions, type of fuel, a traveling pattern, road surface state, and a tire air pressure. The autonomous car may further include a battery that supplies power to the autonomous car, wherein the operations may further include calculating the waiting cost, and determining whether to charge the battery at a charging station during the waiting to maximize the waiting time and minimize the waiting cost. The processor may determine the route with the waiting place being along with the route, and wherein the waiting place may include free and temporary parking. The present disclosure may be implemented not only as the autonomous car having the characteristic configurations described above but also as a traveling controller, a traveling control method, and the like. The traveling controller has a characteristic configuration for controlling the traveling of the autonomous car among the characteristic configurations of the autonomous car. The traveling control method is used to execute a characteristic process corresponding to the characteristic configuration of the traveling controller. The present disclosure may also be implemented as a computer program that causes a computer including a processor, a memory, and the like to execute the characteristic process included in the traveling control method as described above. It goes without saying that the computer program as described above may be distributed with a non-transitory computer-readable storage medium such as a CD-ROM or via a communication network such as the Internet.

Thus, other aspects described below can also exert the same advantageous effects as those of the above-described autonomous car.

According to another aspect of the present disclosure, a traveling controller that controls traveling of an autonomous car includes a memory and a processor that, in operation, performs operations including acquiring meeting information indicating a place of a meeting with a user and a time of the meeting with the user, calculating a remaining time between the time of the meeting and a current time, determining a waiting time for waiting in a waiting place by the autonomous car and a traveling time for traveling to the place of the meeting by the autonomous car, the determining being performed to minimize a total cost and to make a total time within the remaining time, the total cost including a traveling cost of the traveling and a waiting cost of the waiting, the total time including the waiting time and the traveling time, and determining a route along which the autonomous car is to travel to the place of the meeting within the traveling time.

According to another aspect of the present disclosure, a traveling control method for controlling traveling of an autonomous car includes acquiring meeting information indicating a place of a meeting with a user and a time of the meeting with the user, calculating a remaining time between the time of the meeting and a current time, determining a waiting time for waiting in a waiting place by the autonomous car and a traveling time for traveling to the place of the meeting by the autonomous car, the determining being performed to minimize a total cost and to make a total time within the remaining time, the total cost including traveling cost of the traveling and a waiting cost of the waiting, the total time including the waiting time and the traveling time, and determining a route along which the autonomous car is to travel to the place of the meeting within the traveling time.

According to another aspect of the present disclosure, a non-transitory computer-readable storage medium stores a control program causing a computer to function as a traveling controller that controls traveling of an autonomous car, the control program causing the computer to perform operations including acquiring meeting information indicating a place of a meeting with a user and a time of the meeting with the user, calculating a remaining time between the time of the meeting and a current time, determining a waiting time for waiting in a waiting place by the autonomous car and a traveling time for traveling to the place of the meeting by the autonomous car, the determining being performed to minimize a total cost and to make a total time within the remaining time, the total cost including a traveling cost of the traveling and a waiting cost of the waiting, the total time including the waiting time and the traveling time, and determining a route along which the autonomous car is to travel to the place of the meeting within the traveling time.

Note that each of embodiments to be described below represents a specific example of the present disclosure. Shapes, components, steps, the order of the steps, and the like that are described in the embodiments below are merely examples and do not limit the present disclosure. Among components in the following embodiments, a component that is not described in an independent claim corresponding to the highest level description of the present disclosure is described as an optional component. In addition, the content of any of the embodiments may be combined together. Further, various modifications including a change made to the embodiments of the present disclosure within the range in which those skilled in the art are conceived are included in the present disclosure without departing from the spirit of the present disclosure.

Figure 1:
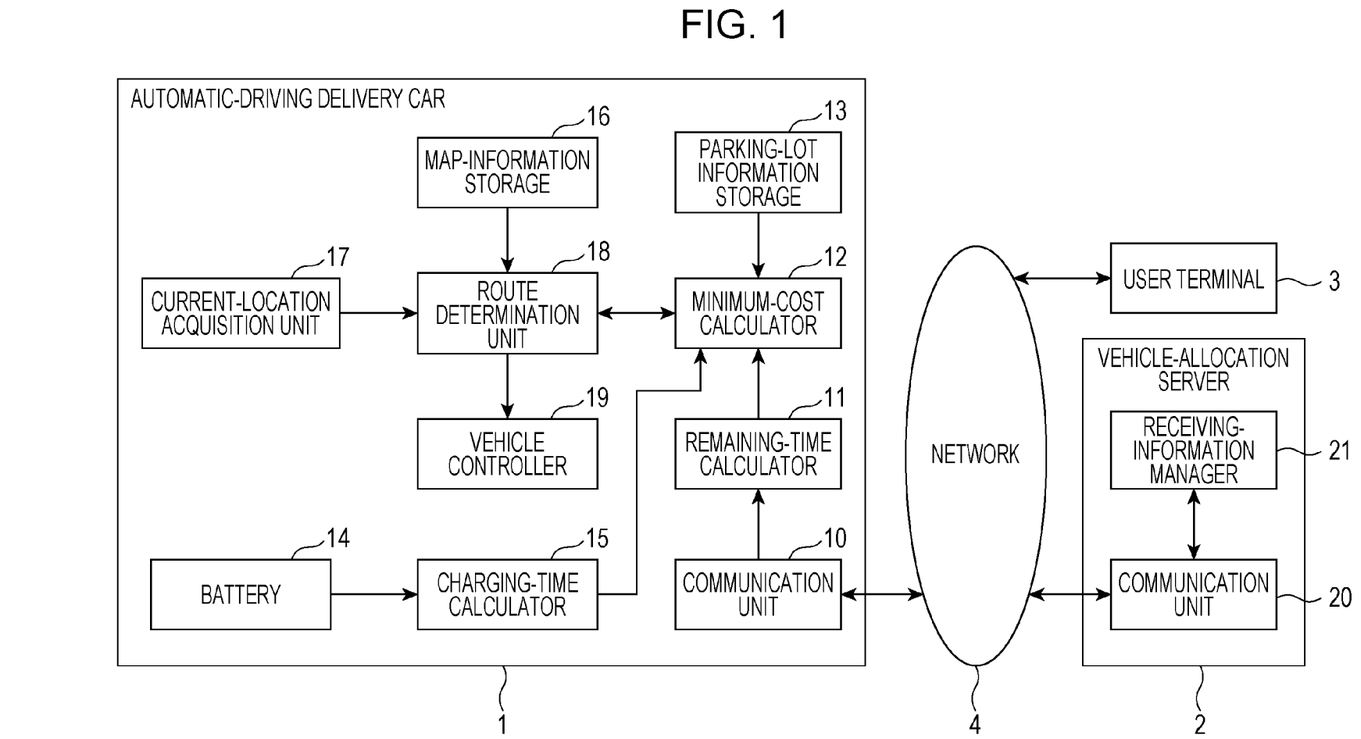
FIG. 1 is a block diagram illustrating an example configuration of a vehicle-allocation system in an embodiment of the present disclosure.

Hereinafter, an embodiment of the present disclosure will be described with reference to the drawings. FIG. 1 is a block diagram illustrating an example configuration of a vehicle-allocation system in an embodiment of the present disclosure.

The vehicle-allocation system illustrated in FIG. 1 includes an automatic-driving delivery car 1, a vehicle-allocation server 2, and a user terminal 3. The automatic-driving delivery car 1 includes a communication unit 10, a remaining-time calculator 11, a minimum-cost calculator 12, a parking-lot information storage 13, a battery 14, a charging-time calculator 15, a map-information storage 16, a current-location acquisition unit 17, a route determination unit 18, and a vehicle controller 19. The vehicle-allocation server 2 includes a communication unit 20 and a receiving-information manager 21.

The automatic-driving delivery car 1, the vehicle-allocation server 2, and the user terminal 3 are connected to be able to communicate with each other via a predetermined wired or wireless network 4 such as the Internet or a dedicated line.

The automatic-driving delivery car 1 is an autonomous car in which a plurality of lockers are arranged in predetermined locations and that delivers packages addressed to users and stored in the lockers. The automatic-driving delivery car 1 performs fully automated driving according to SAE Level 5 defined in J3016 specified by SAE International U.S.A. and delivers packages in an unmanned state. The fully automated driving means implementation of any dynamic driving task by an automatic driving system under any road and environmental conditions.

The automatic-driving delivery car 1 is an electric vehicle using electricity as an energy source and is, for example, a secondary battery-powered electric vehicle. Note that the configuration of the automatic-driving delivery car 1 is not particularly limited to this example, and a different automatic-driving electric vehicle such as a fuel cell powered vehicle may be used. In addition, the energy source of the automatic-driving delivery car 1 is not particularly limited to the example described above, and other various types of automatic-driving automobile may be used, such as a general automatic-driving automobile using an internal combustion engine using gasoline or the like as fuel or a hybrid car using both of an internal combustion engine and a secondary battery.

The automatic-driving delivery car 1 uses, for example, a charged parking lot as a package delivery place and meets a user in the parking lot. Note that any of various parking lots is usable as the parking lot, and, for example, a parking lot having a plurality of parking spaces clearly segmented, a parking lot having a plurality of parking spaces not clearly segmented, or the like corresponds to the parking lot.

The automatic-driving delivery car 1 compares parking cost incurred until time of a meeting with the user and traveling cost involved with traveling time taken until arrival at the parking lot and determines timing of parking and traveling to incur the minimum cost. The traveling cost includes electrical cost involved with electricity consumed in the traveling time taken until the arrival at the parking lot. Specifically, the automatic-driving delivery car 1 calculates remaining time from a difference between the current time and the meeting time. The automatic-driving delivery car 1 acquires a parking charge per unit time for the parking lot for the meeting with the user. The automatic-driving delivery car 1 also calculates electrical cost per unit time needed for the traveling of the automatic-driving delivery car 1. The automatic-driving delivery car 1 calculates a ratio of parking time and the traveling time, the ratio producing the minimum cost within a range in which the sum of the parking time and the traveling time is less or equal to the remaining time. The automatic-driving delivery car 1 calculates such a route that allows arrival at the parking lot in the traveling time based on the calculation result. The automatic-driving delivery car 1 travels along the calculated route and parks in the parking lot when arriving at the parking lot.

Note that the autonomous car of the present disclosure is not particularly limited to the above-described automatic-driving delivery car and may be an automatic-driving transport car that is automatically driven and that transports the user. In this case, the automatic-driving transport car meets the user in a parking lot and transports the user who has ridden in the automatic-driving transport car in the parking lot to a difference place desired by the user.

The vehicle-allocation server 2 is composed of a cloud server and the like including a processor, a memory, an external memory, a communication device, and other components and manages delivery of packages using a parking lot. Note that the configuration of the vehicle-allocation server 2 is not particularly limited to the above-described example, and various modifications may be made. For example, the vehicle-allocation server 2 may have the functions of the remaining-time calculator 11, the minimum-cost calculator 12, the parking-lot information storage 13, the charging-time calculator 15, the map-information storage 16, and the route determination unit 18 that are added thereto and thereby may function as a traveling controller. In this case, the automatic-driving delivery car 1 travels to the parking lot along a route determined by the vehicle-allocation server 2 including the communication unit 10, the battery 14, the current-location acquisition unit 17, and the vehicle controller 19 and functioning as the traveling controller.

The user terminal 3 is composed of a smartphone or the like including, for example, a processor, a memory, a touch panel, and a communication device, and the user uses the user terminal 3 to receive a package. The configuration of the user terminal 3 is not particularly limited to the above-described example, and a different terminal such as a tablet or a desktop or a mobile personal computer may be used.

The receiving-information manager 21 of the vehicle-allocation server 2 manages the delivery schedule of packages. If the automatic-driving delivery car 1 delivers a package for the user using the user terminal 3, the receiving-information manager 21 generates receiving information as meeting information, the receiving information indicating a parking lot that is a place where the user is to receive the package and receiving time, the meeting information indicating the parking lot that is the place of the meeting with the user and the meeting time. The receiving-information manager 21 transmits the receiving information to the user terminal 3 and the automatic-driving delivery car 1 via the communication unit 20.

Note that if the vehicle-allocation server 2 allocates the automatic-driving transport car instead of the automatic-driving delivery car 1, the vehicle-allocation server 2 transmits, as the meeting information indicating the parking lot that is the place of the meeting with the user and the meeting time, riding information indicating the parking lot where the user has ridden and riding time to the automatic-driving transport car, and a traveling control process using the riding information is executed in the same manner as in a traveling control process (described later) using the receiving information.

The user terminal 3 receives the receiving information and displays the parking lot that is the place where the user is to receive the package and the receiving time. The user checks the parking lot and the receiving time that are displayed and arrives at the designated parking lot by the receiving time.

The communication unit 10 of the automatic-driving delivery car 1 receives the receiving information and outputs the receiving information to the remaining-time calculator 11. Note that the receiving information may be output to the remaining-time calculator 11 manually or through not only communication means via a network but also a storage medium or the like. Any configuration for acquiring the receiving information may be collectively referred to as an acquisition unit.

The remaining-time calculator 11 has an internal clock. The remaining-time calculator 11 calculates the remaining time from the difference between the receiving time indicated by the receiving information and the current time indicated by the internal clock and notifies the minimum-cost calculator 12 of the calculated remaining time and the parking lot indicated by the receiving information. It is only sufficient that the internal clock be synchronized with the time of the vehicle-allocation server 2. Time may be adjusted with a global positioning system (GPS) or the like or may be synchronized only between the vehicle-allocation server 2 and the automatic-driving delivery car 1.

The parking-lot information storage 13 stores in advance the charging system, the location information, and the like of each of a plurality of parking lots used as package delivery places by the automatic-driving delivery car 1. A charging system corresponds to, for example, charging a parking charge of 250 yen every 30-minute parking, a parking charge of 300 yen every 40-minute parking, and the like. In this case, a parking charge is incremented every predetermined unit time, and thus the minimum-cost calculator 12 can minimize total cost composed of the parking cost and the electrical cost that are involved with the automatic-driving delivery car 1 as to be described later by effectively utilizing the unit time incurring a fixed parking cost.

The minimum-cost calculator 12 reads out the charging system and the location information regarding the parking lot indicated by the receiving information from the parking-lot information storage 13 and acquires the parking charge per unit time and the location information regarding the parking lot indicated by the receiving information. The minimum-cost calculator 12 also calculates electrical cost needed for traveling per unit time of the automatic-driving delivery car 1 from data regarding the fuel efficiency performance or the like of the automatic-driving delivery car 1 stored in advance in an internal memory or the like. For the fuel efficiency performance, data varying with traveling conditions such as a carrying capacity, the type of fuel, a traveling pattern, road surface state, and a tire air pressure may be stored or updated, and the electrical cost based on values of the data may be calculated.

Note that a method for calculating electrical cost per unit time needed for the traveling of the automatic-driving delivery car 1 is not particularly limited to the above-described example. For example, electrical cost per unit time needed for the traveling of the automatic-driving delivery car 1 may be calculated in advance, the calculated electrical cost per unit time may be stored in advance in a predetermined memory or the like, and the electrical cost may then be read from the memory. A method for acquiring the charging system, the location information, and the like of the parking lot is not particularly limited to the above-described example. The parking-lot information storage 13 may be omitted. Instead, the vehicle-allocation server 2 may store the charging system, the location information, and the like of the parking lot in advance, and the charging system, the location information, and the like regarding the parking lot indicated by the receiving information may be acquired from the vehicle-allocation server 2 via the communication unit 10 or the like. Note that the latest information regarding the parking charge per parking unit time, the location information, and the like may be acquired from a server for a different service providing parking lot information through the Internet, instead of the vehicle-allocation server 2.

The battery 14 includes, for example, a lithium ion secondary battery and supplies power to equipment that consumes electricity in the vehicle, such as the vehicle controller 19. Note that the battery 14 is not particularly limited to the above-described example, and various modifications may be made, such as using a different secondary battery such as a lead storage battery or a nickel-hydrogen battery or using a different battery such as a fuel cell.

The battery 14 notifies the charging-time calculator 15 of the current charge level of the battery 14. The charging-time calculator 15 calculates charging time taken to fully charge the battery 14 from a difference between the current charge level of the battery 14 and a full charge level and outputs the charging time to the minimum-cost calculator 12.

The minimum-cost calculator 12 judges whether to charge the battery 14 based on the charging time output from the charging-time calculator 15. For example, if the charging time is longer than or equal to a predetermined reference charging time, the minimum-cost calculator 12 judges that the battery 14 is to be charged.

Typically, charging at a charging station incurs charging cost but does not incur parking cost during charging, and thus the minimum-cost calculator 12 judges whether to charge the battery 14 to maximize waiting time at the charging station. Note that the criterion for determining whether to charge the battery 14 is not particularly limited to the above-described example. Various modifications can be made, such as judging based on the current charge level of the battery 14 or judging based on the delivery schedule of the automatic-driving delivery car 1 and the current charge level of the battery 14. The delivery schedule includes, for example, a predicted future traveling distance and allowances.

If the battery 14 is not to be charged, the minimum-cost calculator 12 outputs the location information regarding the parking lot indicated by the receiving information to the route determination unit 18.

The map-information storage 16 stores in advance information regarding maps depicting roads where the automatic-driving delivery car 1 travels, charging stations where charging is available, parking lots that are package delivery places, and like. The current-location acquisition unit 17 has a GPS function. The current-location acquisition unit 17 acquires, for example, latitude information and longitude information regarding the current vehicle location of the automatic-driving delivery car 1 as current-location information and outputs the acquired current-location information to the route determination unit 18.

By using the location information regarding the parking lot indicated by the receiving information, the current-location information regarding the automatic-driving delivery car 1, and the map information in the map-information storage 16, the route determination unit 18 determines a predetermined reference route serving as a reference for arriving at the parking lot. The route determination unit 18 calculates traveling time to be taken if the automatic-driving delivery car 1 is automatically driven and travels along the reference route and outputs the result to the minimum-cost calculator 12. The route determination unit 18 may also be referred to as a route determination unit.

The minimum-cost calculator 12 calculates and determines parking time and traveling time by using the parking charge per unit time for the parking lot, the electrical cost per unit time needed for the traveling of the automatic-driving delivery car 1, and the traveling time taken for the reference route. The parking time and the traveling time are determined to minimize total cost composed of the parking cost and the electrical cost and to make the total time within the remaining time, the total time being composed of the parking time and the traveling time, the parking cost being involved with the parking time of parking in the parking lot indicated by the receiving information, the electrical cost being involved with electricity consumed in the battery 14 in the traveling time taken until the automatic-driving delivery car 1 arrives at the parking lot.

For example, assume a case where the parking cost is 250 yen per 30 minutes, the electrical cost is 6 yen per minute, the remaining time is 1 hour, and the traveling time taken until arrival at the parking lot along the reference route is 25 minutes. If the traveling time is 25 minutes without any change, the electrical cost is 150 yen, the parking cost is 500 yen because the parking time is 35 minutes that exceeds 30 minutes, and the total cost is 650 yen.

In the above-described case, to make the parking time shorter than 30 minutes, the minimum-cost calculator 12 sets traveling time increased by 6 minutes and determines parking time of 29 minutes and traveling time of 31 minutes. In this case, the parking cost for 29-minute parking time is 250 yen, the electrical cost for 31-minute traveling time is 186 yen, and the total cost is 436 yen. The total cost can be reduced by 214 yen, and the total cost can be minimized. Note that in the example above, parking cost involved with time taken to deliver the package to the user is not considered. The method for determining the parking time and the traveling time is not particularly limited to this example. The parking cost including time taken to deliver the package may be calculated, the time taken to deliver the package may be subtracted from the remaining time, and thereby the ratio of the parking time and the traveling time to the remaining time resulting from the subtraction may be determined.

The minimum-cost calculator 12 notifies the route determination unit 18 of the parking time and the traveling time that are thus determined and the location information regarding the parking lot indicated by the receiving information. Note that the traveling cost is not particularly limited to the above-described electrical cost, and various modifications may be made to any cost involved with the source of energy consumed in the traveling time taken until arrival at the parking lot. For example, if the automatic-driving delivery car 1 is a hybrid car, total cost composed of fuel cost for gasoline consumed in the traveling time taken until the arrival at the parking lot and the electrical cost are calculated as the traveling cost.

By using the location information regarding the parking lot indicated by the receiving information, the current-location information regarding the automatic-driving delivery car 1, and the map information in the map-information storage 16, the route determination unit 18 determines a route along which the automatic-driving delivery car 1 is automatically driven and travels to arrive at the parking lot in the traveling time determined by the minimum-cost calculator 12. The route determination unit 18 notifies the vehicle controller 19 of the route. For example, if traveling time taken to travel to the parking lot along a predetermined route is 25 minutes, but if the traveling time determined by the minimum-cost calculator 12 is 31 minutes, the route determination unit 18 determines a route leading to an increase of 6 minutes in traveling time. Note that if there is a free and temporary parking place on the route, route selection may be performed in such a manner as to select traveling along the shortest route and parking in the free and temporary parking place for 6 minutes.

The vehicle controller 19 includes a motor, an inverter, a power control unit, and the like. The vehicle controller 19 rotates the motor by using power supplied from the battery 14 and thereby turns wheels. The vehicle controller 19 causes the automatic-driving delivery car 1 to travel along the route determined by the route determination unit 18, to arrive, by the receiving time indicated by the receiving information, at the parking lot where the user is to receive the package, and to park and wait in the parking lot until the user's arrival.

In addition, if the battery 14 is to be charged, the minimum-cost calculator 12 notifies the route determination unit 18 of the location information regarding the parking lot indicated by the receiving information and charging of the battery 14 at the charging station.

By using the location information regarding the parking lot indicated by the receiving information, the current-location information regarding the automatic-driving delivery car 1, the location information regarding the charging station, and the map information stored in the map-information storage 16 and including the location information regarding the parking lot indicated by the receiving information, the route determination unit 18 determines a charging route for arriving at the parking lot via the charging station, calculates traveling time taken for the automatic-driving delivery car 1 to be automatically driven and travel along the charging route, and outputs the traveling time to the minimum-cost calculator 12. The traveling time in this case does not include the charging time.

By using the parking charge per unit time for the parking lot, the electrical cost per unit time needed for the traveling of the automatic-driving delivery car 1, and the traveling time taken for the charging route, the minimum-cost calculator 12 determines the parking time and the traveling time to minimize the total cost composed of the parking cost and the electrical cost and to make total time within the remaining time, the total time being composed of the charging time, the parking time, and the traveling time, the parking cost being involved with the parking time of the parking in the parking lot indicated by the receiving information, the electrical cost being involved with electricity consumed in the battery 14 in the traveling time taken until the automatic-driving delivery car 1 arrives at the parking lot via the charging station.

For example, assume a case where the parking cost is 250 yen per 30 minutes, the electrical cost is 6 yen per minute, the remaining time is 1 hour, the charging time is 10 minutes, and the traveling time to the parking lot along the charging route is 15 minutes. If the traveling time is 15 minutes without any change, the electrical cost is 90 yen, the parking cost is 500 yen because the parking time is 35 minutes that exceeds 30 minutes, and the total cost is 590 yen.

In the above-described case, to make the parking time shorter than 30 minutes, the minimum-cost calculator 12 sets traveling time increased by 6 minutes and determines charging time of 10 minutes, parking time of 29 minutes, and traveling time of 21 minutes. In this case, the parking cost for the 29-minute parking time is 250 yen, the electrical cost for the 21-minute traveling time is 126 yen, and the total cost is 376 yen. The total cost can be reduced by 214 yen, and thus the total cost can be minimized.

The minimum-cost calculator 12 notifies the route determination unit 18 of the parking time and the traveling time that are thus determined, the location information regarding the parking lot indicated by the receiving information, and the charging time taken to charge the battery 14.

By using the location information regarding the parking lot indicated by the receiving information, the current-location information regarding the automatic-driving delivery car 1, and the map information in the map-information storage 16, the route determination unit 18 determines a route along which the automatic-driving delivery car 1 is automatically driven and travels to arrive at the parking lot in total time composed of the traveling time and the charging time, the traveling time being taken to travel via the charging station for charging the battery 14 and being determined by the minimum-cost calculator 12, the charging time being taken to charge the battery 14 at the charging station. The route determination unit 18 then notifies the vehicle controller 19 of the determined route. For example, if the traveling time taken to travel to the parking lot along the charging route is 15 minutes, but if the traveling time determined by the minimum-cost calculator 12 is 21 minutes, the route determination unit 18 determines a route leading to an increase of 6 minutes in the traveling time.

The vehicle controller 19 causes the automatic-driving delivery car 1 to travel and the battery 14 to be charged at the charging station in accordance with the route determined by the route determination unit 18 and causes the automatic-driving delivery car 1 to thereafter arrive, by the receiving time indicated by the receiving information, at the parking lot where the user is to receive the package and to wait until the user arrives at the parking lot.

If the parking lot where the user is to receive the package is also the charging station, the automatic-driving delivery car 1 may enter the parking lot, charge the battery 14, thereafter park in the parking lot, and wait until the user arrives.

In this embodiment, the minimum-cost calculator 12 judges whether to charge the battery 14 based on the charging time output from the charging-time calculator 15. However, the embodiment is not particularly limited to this example. For example, the charging-time calculator 15 may be omitted, and the minimum-cost calculator 12 may determine the parking time and the traveling time without judging whether to charge the battery 14.

Figure 2:
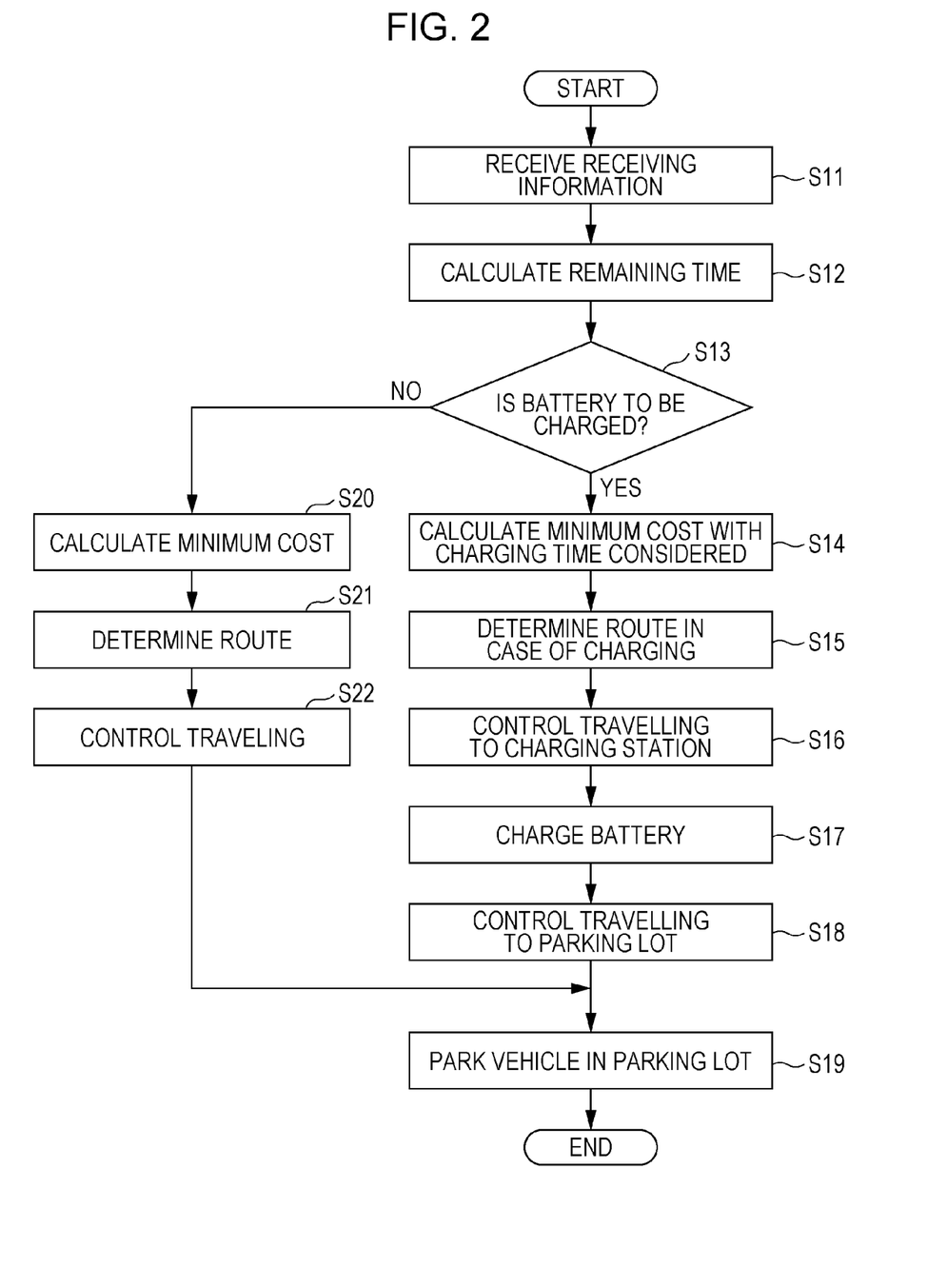
FIG. 2 is a flowchart illustrating an example of a traveling control process by an automatic-driving delivery car illustrated in FIG. 1.

The traveling control process by the automatic-driving delivery car 1 configured as described above will be described. FIG. 2 is a flowchart illustrating an example of the traveling control process by the automatic-driving delivery car 1 illustrated in FIG. 1.

First, the receiving-information manager 21 transmits, to the automatic-driving delivery car 1, receiving information indicating a parking lot that is a place where the user is to receive a package and receiving time, and the communication unit 10 of the automatic-driving delivery car 1 then receives the receiving information and outputs the receiving information to the remaining-time calculator 11 (step S11).

The remaining-time calculator 11 calculates remaining time from a difference between the receiving time indicated by the receiving information and the current time indicated by the internal clock and notifies the minimum-cost calculator 12 of the calculated remaining time and the parking lot indicated by the receiving information (step S12).

The minimum-cost calculator 12 acquires charging time taken to charge the battery 14 from the charging-time calculator 15 and judges whether to charge the battery 14 by judging whether the charging time is longer than or equal to a predetermined reference charging time (for example, 10 minutes) (step S13). If the charging time is longer than or equal to the predetermined reference charging time and thus the battery 14 is to be charged (YES in step S13), the process moves to step S14. In contrast, if the charging time is shorter than the predetermined reference charging time and thus the battery 14 is not to be charged (NO in step S13), the process moves to step S20.

If the charging time is shorter than the predetermined reference charging time and thus the battery 14 is not to be charged (NO in step S13), the minimum-cost calculator 12 calculates the minimum total cost composed of parking cost and electrical cost and determines parking time and traveling time (step S20). Specifically, the minimum-cost calculator 12 acquires remaining time from the remaining-time calculator 11, the charging system and the location information regarding the parking lot indicated by the receiving information from the parking-lot information storage 13, the traveling time taken to travel along the predetermined route from the route determination unit 18, and the like. The minimum-cost calculator 12 determines the parking time and the traveling time to minimize total cost composed of the parking cost and the electrical cost and to make total time within the remaining time, the total time being composed of the parking time and the traveling time, the parking cost being involved with the parking time of parking in the parking lot indicated by the receiving information, the electrical cost being involved with electricity consumed in the battery 14 in the traveling time taken until the automatic-driving delivery car 1 arrives at the parking lot.

By using location information regarding the parking lot indicated by the receiving information, current-location information regarding the automatic-driving delivery car 1, and map information in the map-information storage 16, the route determination unit 18 determines a route along which the automatic-driving delivery car 1 is automatically driven and travels to arrive at the parking lot in the traveling time determined by the minimum-cost calculator 12 (step S21).

The vehicle controller 19 controls the automatic-driving delivery car 1 and causes the automatic-driving delivery car 1 to travel along the route determined by the route determination unit 18 (step S22).

The vehicle controller 19 causes the automatic-driving delivery car 1 to arrive, by the receiving time indicated by the receiving information, at the parking lot where the user is to receive the package and to park and wait in the parking lot until the user's arrival (step S19). The process is then terminated.

In contrast, if the charging time is longer than or equal to the predetermined reference charging time and thus the battery 14 is to be charged (YES in step S13), the minimum-cost calculator 12 calculates the minimum total cost composed of the parking cost and the electrical cost with the charging time taken into consideration and determines the parking time and the traveling time (step S14). Specifically, the minimum-cost calculator 12 acquires the remaining time from the remaining-time calculator 11, the charging system and the location information regarding the parking lot indicated by the receiving information from the parking-lot information storage 13, the traveling time taken to travel along a charging route from the route determination unit 18, and the like. The minimum-cost calculator 12 determines the parking time and the traveling time to minimize total cost composed of the parking cost and the electrical cost and to make total time within the remaining time, the total time being composed of the charging time, the parking time, and the traveling time, the parking cost being involved with the parking time of the parking in the parking lot indicated by the receiving information, the electrical cost being involved with electricity consumed in the battery 14 in the traveling time taken until the automatic-driving delivery car 1 arrives at the parking lot via the charging station for charging the battery 14.

By using the location information regarding the parking lot indicated by the receiving information, the current-location information regarding the automatic-driving delivery car 1, and the map information in the map-information storage 16, the route determination unit 18 determines a route along which the automatic-driving delivery car 1 is automatically driven and travels to arrive at the parking lot in the total time composed of the traveling time and the charging time, the traveling time being taken to travel via the charging station for charging the battery 14 and being determined by the minimum-cost calculator 12, the charging time being taken to charge the battery 14 at the charging station (step S15).

The vehicle controller 19 controls the automatic-driving delivery car 1 and causes the automatic-driving delivery car 1 to travel to the charging station determined by the route determination unit 18 along the route via the charging station (step S16).

The automatic-driving delivery car 1 charges the battery 14 at the charging station (step S17).

The vehicle controller 19 controls the automatic-driving delivery car 1 and causes the automatic-driving delivery car 1 to travel to the parking lot along the route determined by the route determination unit 18 (step S18).

The vehicle controller 19 arrives, by the receiving time indicated by the receiving information, at the parking lot where the user is to receive the package and parks and waits in the parking lot until the user's arrival (step S19). The process is then terminated.

In the process described above in this embodiment, the receiving information indicating the parking lot that is the place where the user is to receive the package and the receiving time is acquired, the remaining time is calculated from a difference between the receiving time and the current time, and the parking time and the traveling time are determined to minimize the total cost composed of the parking cost and the electrical cost and to make the total time within the remaining time, the total time being composed of the parking time and the traveling time, the parking cost being involved with the parking time of the parking in the parking lot, the electrical cost being involved with the electricity consumed in the battery 14 in the traveling time taken until the automatic-driving delivery car 1 arrives at the parking lot. Subsequently, the route along which the automatic-driving delivery car 1 is caused to travel to arrive at the parking lot in the determined traveling time is determined. Accordingly, the automatic-driving delivery car 1 can arrive at the parking lot by the receiving time, and the total cost composed of the parking cost involved with the automatic-driving delivery car 1 and the electrical cost can be minimized. As a result, if the unmanned automatic-driving delivery car 1 uses a charged parking lot as a place where the user is to receive the package, the automatic-driving delivery car 1 can arrive at the parking lot by the receiving time when the user is to receive the package, and the cost involved with the automatic-driving delivery car 1 can be minimized.

In addition, the charging time taken to charge the battery 14 is calculated, and the parking time and the traveling time are calculated to minimize the total cost composed of the parking cost and the electrical cost and to make the total time within the remaining time, the total time being composed of the charging time, the parking time, and the traveling time. The route along which the automatic-driving delivery car 1 is caused to travel to arrive at the parking lot after charging the battery 14 and in the determined traveling time is then determined. Accordingly, the automatic-driving delivery car 1 can charge the battery 14 and arrive at the parking lot by the receiving time when the user is to receive the package. Further, the parking cost corresponding to the charging time for the battery 14 can be reduced, and the total cost composed of the parking cost and the electrical cost that are involved with the automatic-driving delivery car 1 can thus be reduced more.

Note that in the example described above, the charged parking lot is used as the package delivery place that is an example of the place of the meeting with the user, and waiting is performed in the parking lot serving as the waiting place. However, the waiting place is not particularly limited to this example. For example, the waiting may be performed in a parking lot other than the destination, instead of the place of the meeting with the user that is the destination. In addition, in the example described above, waiting is performed in the charged parking lot that is the package delivery place, but time to wait is not particularly limited to this example. For example, the waiting may be performed at any time such as before the traveling, in the course of the traveling route, after arriving at the meeting place. To determine the waiting place, a parking lot incurring a low parking cost on the traveling route or near the traveling route may be selected. In addition, a place other than the parking lot, such as the charging station may be used as the waiting place. The waiting time includes time of parking and time of charging at the charging station.

Figure 3:
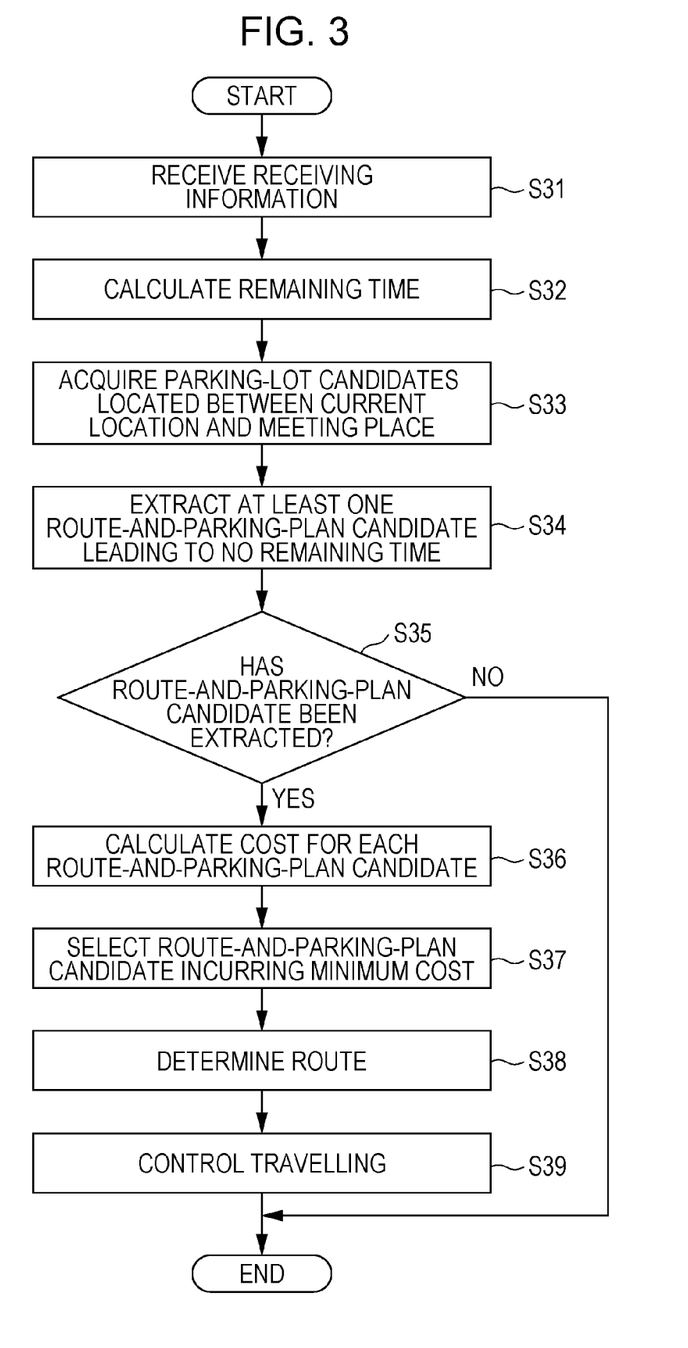
FIG. 3 is a flowchart illustrating an example of another traveling control process by the automatic-driving delivery car illustrated in FIG. 1.

Another traveling control process by the automatic-driving delivery car 1 configured as described above will be described. FIG. 3 is a flowchart illustrating an example of the traveling control process by the automatic-driving delivery car 1 illustrated in FIG. 1.

First, the receiving-information manager 21 transmits, to the automatic-driving delivery car 1, receiving information indicating a place where the user is to receive a package that is a meeting place and receiving time that is meeting time, and the communication unit 10 of the automatic-driving delivery car 1 then receives the receiving information and outputs the receiving information to the remaining-time calculator 11 (step S31). Note that the meeting place may be a parking lot.

The remaining-time calculator 11 calculates remaining time from a difference between the receiving time indicated by the receiving information and the current time indicated by the internal clock and notifies the route determination unit 18 and the minimum-cost calculator 12 of the calculated remaining time and the meeting place indicated by the receiving information (step S32).

The route determination unit 18 acquires, from the map-information storage 16, parking-lot candidates located between the current location of the automatic-driving delivery car 1 acquired by the current-location acquisition unit 17 and the meeting place (step S33). Note that a parking lot located within a predetermined range from a route between the current location and the meeting place may be selected as a parking lot to be used, or a limited range for extracting parking-lot candidates may be used. In addition, a charged parking lot, a parking lot provided by a retail store or the like, or the like may be used as the parking lot.

The route determination unit 18 extracts at least one route-and-parking-plan candidate leading to no remaining time (step S34). Note that route-and-parking-plan candidates the number of which has been set may be extracted, or as many route-and-parking-plan candidates as possible within a predetermined time period may be extracted.

The route determination unit 18 judges whether the route-and-parking-plan candidate has been extracted (step S35). If the route-and-parking-plan candidate has not been extracted (NO in step S35), the process is terminated.

In contrast, if the route-and-parking-plan candidate has been extracted (YES in step S35), the route determination unit 18 outputs all of the route-and-parking-plan candidates to the minimum-cost calculator 12, and the minimum-cost calculator 12 calculates cost for each route-and-parking-plan candidate (step S36).

The minimum-cost calculator 12 selects a route-and-parking-plan candidate leading to the minimum cost and determines parking time and traveling time (step S37).

By using the location information regarding the meeting place indicated by the receiving information, the current-location information regarding the automatic-driving delivery car 1, and the map information in the map-information storage 16, the route determination unit 18 determines a route along which the automatic-driving delivery car 1 is automatically driven and travels to arrive at the meeting place in the traveling time determined by the minimum-cost calculator 12 (step S38).

The vehicle controller 19 controls the automatic-driving delivery car 1 and causes the automatic-driving delivery car 1 to travel along the route determined by the route determination unit 18 (step S39), and the process is then terminated.

The process described above enables the automatic-driving delivery car 1 to wait in the parking lot or the like appropriately at time such as before the traveling, in the course of the traveling route, after arriving at the meeting place and to arrive at the meeting place by the receiving time and also enables cost involved with the automatic-driving delivery car 1 to be minimized.

Although the autonomous car that performs the automatic driving with SAE Level 5 has heretofore been described, the embodiment of the present disclosure may be applied to an autonomous car that performs automatic driving with any of Levels 1 to 4, and the autonomous cars do not have to be unmanned. In addition, a receiver is a person or a thing that performs an action of taking out a package and is applicable to, for example, a person that finally receives the package, a deliveryman, a receiver agent (such as a caretaker or a concierge), a robot serving as these, and the like.

Each of the autonomous car, the traveling controller, and the traveling control method according to the present disclosure enables an autonomous car to arrive, by time of a meeting with a user, at a charged parking lot used as a place of the meeting with the user, enables cost involved with the autonomous car to be minimized, and is thus useful as an autonomous car that meets a user, a traveling controller that controls traveling of the autonomous car, and a traveling control method for controlling traveling of the autonomous car.

What is claimed is:

1. An autonomous car, comprising:
a memory; and
a processor that, in operation, performs operations including:
acquiring meeting information indicating a place of a meeting with a user and a time of the meeting with the user;
calculating a remaining time between the time of the meeting and a current time;
determining a waiting time for waiting in a waiting place by the autonomous car and a traveling time for traveling to the place of the meeting by the autonomous car, the determining being performed to minimize a total monetary cost and to make a total time equal the remaining time, the total monetary cost including a traveling monetary cost of the traveling and a waiting monetary cost for the waiting, the total time including the waiting time and the traveling time, the waiting monetary cost including a parking charge per unit time for the waiting, the parking charge per unit time being incurred incrementally during the waiting time;
determining a route along which the autonomous car is to travel to the place of the meeting and to arrive at the place of the meeting with no remaining time; and
controlling the autonomous car to travel along the route and to wait at the waiting place during the total time in order to arrive at the place of the meeting,
wherein, in determining the waiting time and the traveling time to minimize the total monetary cost, the waiting time is decreased by an amount of time so that the waiting time is below a threshold corresponding to the parking charge per unit time, and the traveling time is increased by the amount of time, and
in the determining the route along which the autonomous car is to travel to the place of the meeting, the route is determined which leads to an increase of the traveling time, the route not being a shortest route to the place of the meeting.

2. The autonomous car according to claim 1,
wherein the autonomous car is an electric vehicle configured to use electricity as a source of energy for the traveling, and
wherein the total monetary cost includes an electrical monetary cost of electricity consumed in the traveling.

3. The autonomous car according to claim 2, further comprising:
a battery that supplies power to the autonomous car,
wherein the operations further include:
calculating a charging time for charging the battery, the total time including the charging time, the waiting time, and the traveling time, and wherein the route is for causing the electric vehicle to travel to the place of the meeting after the charging of the battery.

4. The autonomous car according to claim 1, wherein the operations further include:
calculating the waiting monetary cost based on the parking charge per unit time incurred incrementally during the waiting time.

5. The autonomous car according to claim 1, wherein the operations further include:
calculating the traveling monetary cost based on fuel efficiency performance or electrical monetary cost needed for traveling per unit time, the traveling monetary cost being a monetary cost of a source of energy consumed in the traveling to the place of the meeting.

6. The autonomous car according to claim 1, wherein the autonomous car is an automatic-driving delivery car that is automatically driven and that delivers a package to the user, and
wherein the place of the meeting is where the package to the user is to be delivered to the user.

7. The autonomous car according to claim 1, wherein the autonomous car is an automatic-driving transport car that is automatically driven and that transports the user, and
wherein the place of the meeting is where the user is to begin transport in the autonomous car.

8. The autonomous car according to claim 1, wherein the waiting place is a same place as the place of the meeting.

9. The autonomous car according to claim 1, wherein the waiting place is the place of the meeting with the user, and
the parking charge per unit time is incurred incrementally until the time of the meeting with the user.

10. The autonomous car according to claim 9, wherein the memory stores in advance a plurality of parking lots and parking monetary costs associated with the plurality of parking lots.

11. The autonomous car according to claim 1, wherein the operations further include:
calculating a ratio of the waiting time and the traveling time in order to minimize the total monetary cost, wherein the total monetary cost includes the parking charge per unit time and a traveling cost per unit time.

12. The autonomous car according to claim 1, wherein the operations further include:
calculating the traveling monetary cost of the traveling based on fuel efficiency performance, the fuel efficiency performance including at least one of traveling conditions, type of fuel, a traveling pattern, road surface state, and a tire air pressure.

13. The autonomous car according to claim 1, further comprising:
a battery that supplies power to the autonomous car, wherein the operations further include:
calculating the waiting monetary cost; and
determining whether to charge the battery at a charging station during the waiting to maximize the waiting time and minimize the waiting monetary cost.

14. A traveling controller that controls traveling of an autonomous car, the traveling controller comprising:
a memory; and
a processor that, in operation, performs operations including:

acquiring meeting information indicating a place of a meeting with a user and a time of the meeting with the user;
calculating a remaining time between the time of the meeting and a current time;
determining a waiting time for waiting in a waiting place by the autonomous car and a traveling time for traveling to the place of the meeting by the autonomous car, the determining being performed to minimize a total monetary cost and to make a total time equal the remaining time, the total monetary cost including a traveling monetary cost of the traveling and a waiting monetary cost for the waiting, the total time including the waiting time and the traveling time, the waiting monetary cost including a parking charge per unit time for the waiting, the parking charge per unit time being incurred incrementally during the waiting time;
determining a route along which the autonomous car is to travel to the place of the meeting and to arrive at the place of the meeting with no remaining time; and
controlling the autonomous car to travel along the route and to wait at the waiting place during the total time in order to arrive at the place of the meeting,
wherein, in determining the waiting time and the traveling time to minimize the total monetary cost, the waiting time is decreased by an amount of time so that the waiting time is below a threshold corresponding to the parking charge per unit time, and the traveling time is increased by the amount of time, and
in the determining the route along which the autonomous car is to travel to the place of the meeting, the route is determined which leads to an increase of the travelling time, the route not being a shortest route to the place of the meeting.

15. A traveling control method for controlling traveling of an autonomous car, the traveling control method comprising:
acquiring meeting information indicating a place of a meeting with a user and a time of the meeting with the user;
calculating a remaining time between the time of the meeting and a current time;
determining a waiting time for waiting in a waiting place by the autonomous car and a traveling time for traveling to the place of the meeting by the autonomous car, the determining being performed to minimize a total monetary cost and to make a total time equal the remaining time, the total monetary cost including a traveling monetary cost of the traveling and a waiting monetary cost for the waiting, the total time including the waiting time and the traveling time, the waiting monetary cost including a parking charge per unit time for the waiting, the parking charge per unit time being incurred incrementally during the waiting time; and
determining a route along which the autonomous car is to travel to the place of the meeting and to arrive at the place of the meeting with no remaining time; and
controlling the autonomous car to travel along the route and to wait at the waiting place during the total time in order to arrive at the place of the meeting,
wherein, in determining the waiting time and the traveling time to minimize the total monetary cost, the waiting time is decreased by an amount of time so that the waiting time is below a threshold corresponding to the parking charge per unit time, and the traveling time is increased by the amount of time, and in the determining the route along which the autonomous car is to travel to the place of the meeting, the route is determined which leads to an increase of the travelling time, the route not being a shortest route to the place of the meeting.

16. A non-transitory computer-readable storage medium storing a control program causing a computer to function as a traveling controller that controls traveling of an autonomous car, the control program causing the computer to perform operations including:

acquiring meeting information indicating a place of a meeting with a user and a time of the meeting with the user;

calculating a remaining time between the time of the meeting and a current time;

determining a waiting time for waiting in a waiting place by the autonomous car and a traveling time for traveling to the place of the meeting by the autonomous car, the determining being performed to minimize a total monetary cost and to make a total time equal the remaining time, the total monetary cost including a traveling monetary cost of the traveling and a waiting monetary cost for the waiting, the total time including the waiting time and the traveling time, the waiting monetary cost including a parking charge per unit time for the waiting, the parking charge per unit time being incurred incrementally during the waiting time; and determining a route along which the autonomous car is to travel to the place of the meeting and to arrive at the place of the meeting with no remaining time; and controlling the autonomous car to travel along the route and to wait at the waiting place during the total time in order to arrive at the place of the meeting, wherein, in determining the waiting time and the traveling time to minimize the total monetary cost, the waiting time is decreased by an amount of time so that the waiting time is below a threshold corresponding to the parking charge per unit time, and the traveling time is increased by the amount of time, and in the determining the route along which the autonomous car is to travel to the place of the meeting, the route is determined which leads to an increase of the travelling time, the route not being a shortest route to the place of the meeting.

* * * * *